Patented Jan. 13, 1931

1,788,781

UNITED STATES PATENT OFFICE

GERHARD STEIMMIG, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

SOLUTION AND PLASTIC

No Drawing. Original application filed April 22, 1926, Serial No. 103,951, and in Germany April 24, 1925. Divided and this application filed October 23, 1926. Serial No. 143,805.

The subject-matter of this application has been divided out of my copending application Serial No. 103,951, filed April 22, 1926, with the express intention to apply for this divisional application.

I have stated in the said copending application that mono-aryl ethers of ethylene glycol and its homologues, which ethers correspond to the general formula

(in which R indicates an aryl group) are excellently suitable for preparing solutions of organic substances (which term, however, is not to include the usual solvents of low boiling point and such materials as are well known to be insoluble in most organic solvents such as coal or wood), for example cellulose bodies, that is to say water-insoluble cellulose ethers, for instance ethyl cellulose, for the other more or less solid constituents of lacquers, such as resins, lacs, siccatives, dyestuffs, caoutchouc, oils, and other organic substances, and can be employed advantageously in the industry lacquers and colors, varnishes, and the like. The glycol derivatives can be employed alone or in mixture with other solvents.

The said glycol derivatives are of special value in the industry of cellulose lacquers, plastics and films, as they are excellently suitable for use as plasticizers by reason of their high boiling point and low volatility. They may be employed alone or in mixture with other plasticizers such as for example camphor, castor oil, esters of phosphoric acid with phenols, esters of phthalic acid and other plasticizers. I do not lay claim in this application to the use of ethylene glycol mono-aryl-ethers as plasticizers for cellulose ester preparations and the appended claims should be read with this limitation.

As the above mentioned glycol derivatives are not only excellent solvents for cellulose bodies, but also for resins, oils, dyes and the like, it is possible to prepare cellulose-body lacquers and plastics containing a substantial amount of natural or artificial resins, for example of colophony, sandarac or the so-called ester resins, caoutchouc or any other desired addition. Thereby the properties of the lacquers or plastics may be adapted to all requirements.

The following examples will further illustrate how my invention may be carried out in practice, but the invention is not limited to these examples. The parts are by weight.

Example 1

50 parts of ethyl cellulose are dissolved in a mixture of 500 parts of isobutyl acetate, 250 parts of toluene, 180 parts of ethyl alcohol and between 10 and 20 parts of ethylene glycol mono-phenyl ether. The resulting lacquer forms clear, adherent coatings of high suppleness. Other plasticizers or resins, coloring matters or the like may also be added to the solution. Instead of ethylene glycol mono-phenyl ether, the corresponding mono-cresyl ethers or mixtures thereof may be employed.

Example 2

50 parts of alcohol-soluble nigrosine (see G. Schultz, Farbstofftabellen, 6th edition, No. 698) are dissolved in about 200 parts of ethylene glycol mono-cresyl ether or a mixture thereof with the formate of ethylene glycol mono-prophyl ether while slightly heating and diluted with about 150 parts of a mixture of ethyl alcohol and benzine. The solution can be employed for example for blackening colored shoes.

The mixture may also contain Russian leather oil or the like as a perfume.

I claim:

1. A composition of matter comprising a cellulose ether and a mono-aryl ether of ethylene glycol.

2. A composition of matter comprising a cellulose ether and a mono-aryl ether of a glycol.

3. A lacquer comprising a water-insoluble cellulose ether, a mono aryl ether of a glycol and the customary solid constituents of lacquers.

4. A lacquer comprising a water-insoluble cellulose ether, a mono aryl ether of a glycol and an organic liquid dissolving the said substances.

5. A lacquer comprising a water-insoluble cellulose ether, a mono aryl ether of a glycol, a resin and an organic liquid dissolving the said substances.

6. A lacquer comprising a water-insoluble cellulose ether, a mono aryl ether of a glycol, a resin, an organic liquid dissolving the said substances and a coloring matter.

In testimony whereof I have hereunto set my hand.

GERHARD STEIMMIG.